(12) United States Patent
Mukherjee et al.

(10) Patent No.: US 6,289,223 B1
(45) Date of Patent: Sep. 11, 2001

(54) SYSTEM AND METHOD FOR SELECTIVE MULTIPOINT TRANSMISSION OF SHORT MESSAGE SERVICE MESSAGES

(75) Inventors: Subrata Mukherjee; Mahesh Patel, both of Plano; David Boltz, Garland; Farzad Hiri, Dallas; Walt Evanyk, Plano, all of TX (US)

(73) Assignee: Ericsson INC, Research Triangle Park, NC (US)

( * ) Notice: Subject to any disclaimer, the term of this patent is extended or adjusted under 35 U.S.C. 154(b) by 0 days.

(21) Appl. No.: 09/120,976

(22) Filed: Jul. 22, 1998

(51) Int. Cl.[7] .................................................. H04B 7/00

(52) U.S. Cl. .............................................. 455/466; 455/518

(58) Field of Search ..................................... 455/422, 445, 455/458, 466, 517, 518, 519, 520, 560

(56) References Cited

U.S. PATENT DOCUMENTS

| 5,806,000 | * | 9/1998 | Vo et al. | 455/466 |
| 6,026,296 | * | 2/2000 | Sander, III et al. | 455/520 |

* cited by examiner

*Primary Examiner*—Thanh Cong Le
(74) *Attorney, Agent, or Firm*—Jenkins & GilChrist PC (57) ABSTRACT

A system and method in a telecommunications system for enabling an originating mobile unit to deliver SMS messages to a select plurality of destination mobile units. A mobile station ISDN number (MSISDN) is assigned to a usergroup wherein this usergroup contains at least one and preferably a plurality of member MSISDNs. An originating mobile unit may then transmit an SMS message to a plurality of destination units by transmitting an SMS message addressed to a predefined usergroup MSISDN thereby eliminating the necessity of the originating mobile unit addressing and transmitting the SMS message to each member of the defined usergroup. Allowances are made to restrict such transmission to specified originating units.

28 Claims, 5 Drawing Sheets

FIG. 5

SYSTEM AND METHOD FOR SELECTIVE MULTIPOINT TRANSMISSION OF SHORT MESSAGE SERVICE MESSAGES

BACKGROUND OF THE INVENTION

1. Technical Field of the Invention

The present invention relates to a mobile telecommunication network and, in particular, to the multipoint transmission of short message service (SMS) messages to selected multipoint destinations.

2. Description of the Related Art

The evolution of wireless communication over the past century, since Guglielmo Marconi's 1897 demonstration of radio's ability to provide continuous contact with ships sailing the English Channel, has been remarkable. Since Marconi's discovery, new wireline and wireless communication methods, services and standards have been adopted by people throughout the world. This evolution has been accelerating, particularly over the last ten years, during which the mobile radio communications industry has grown by orders of magnitude, fueled by numerous technological advances that have made portable radio equipment smaller, cheaper and more reliable. The exponential growth of mobile telephony will continue in the coming decades as well, as this wireless network interacts with and eventually overtakes the existing wireline networks.

In order to promote compatibility of the equipment and operations of various Public Land Mobile Networks (PLMN), standards have been developed and are currently being implemented, e.g., the Global System for Mobile Communications (GSM), Personal Communications System (PCS) and other standards.

With the introduction of GSM, PCS and other digital-based telecommunications systems, a number of advanced non-speech services are further provided to mobile subscribers. One such service includes a point-to-point Short Message Service (SMS), a subscriber service which operates similarly to a pager. Using an SMS message, a mobile subscriber is able to communicate text messages with another Mobile Station (MS) or an SMS terminal without establishing a circuit connection. A first mobile subscriber simply types the desired text message, e.g., up to about 160 alphanumeric characters, indicates the directory number associated with the destination mobile subscriber, and transmits the SMS message encapsulating the desired text message.

Another type of SMS messaging currently available is multipoint or cell broadcast in which a given message, e.g., traffic conditions, stock exchange information, etc., is transmitted to all active mobile phones in a particular cell. One difference between point-to-point and multipoint is that whereas reception confirmation is generally obtained in point-to-point transmissions, multipoint SMS is a one-way transmission without confirmation.

At present only the above two modes of SMS messaging are available: a message to one or all. Current SMS systems and services are unable to selectively deliver an SMS message to a subset of the available users, e.g., many in the aforementioned particular cell, such as all sales people in a company. Accordingly, there is a need for a selection mechanism so that an SMS subscriber can specify a number of other SMS subscribers to receive a given communication without having to transmit to all possible SMS subscribers.

SUMMARY OF THE INVENTION

The present invention discloses a system and method that enables the transmission of SMS messages to select multipoint addressees from a single point of origination. Point to select multipoint SMS, hereinafter referred to as select multipoint SMS, would require that the user desiring to originate such a transmission be a subscriber to such service. A valid subscriber could then define a usergroup of SMS subscribers to which a multipoint SMS transmission is desired. Preferably, the originating user would be allowed to define a plurality of such groups, with each group having a unique identifier. A database of such groups would then be maintained in the Service Center (SC). When the user desires to send a multipoint SMS message, creation and transmission of such a message would follow in a manner similar to traditional point-to-point SMS broadcasts. The originating user would first enter the desired message, either through the ten-digit keypad of the mobile phone or through a DTE or other appropriate device. The user would then initiate an SMS transmission by entering the group identifier in place of the receiver identifier. In this manner, once the usergroups and identifiers have been defined, a multipoint SMS transmission would be executed significantly as a point-to-point SMS transmission.

Upon reception of the SMS request at the SC, the SC would recover the receiver identifier from the request and thereupon interrogate the usergroup database in the SC. The SC would recognize the receiver identifier as a group identifier and subsequently recover each member's identifier of the defined usergroup therein. Transmission of the identical SM is then initiated to each group member. Failure to identify the receiver identifier as a group identifier causes the SC to process the SMS request as a 'normal'point-to-point transmission or, if applicable, a multicast transmission.

Allowances are also made for usergroup access restriction, such that only certain users would have privilege to originate a SMS multipoint transmission to a specific usergroup. Proposals for augmenting the usergroup profiles via the Internet are also made.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE PRESENTLY PREFERRED EXEMPLARY EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 1:
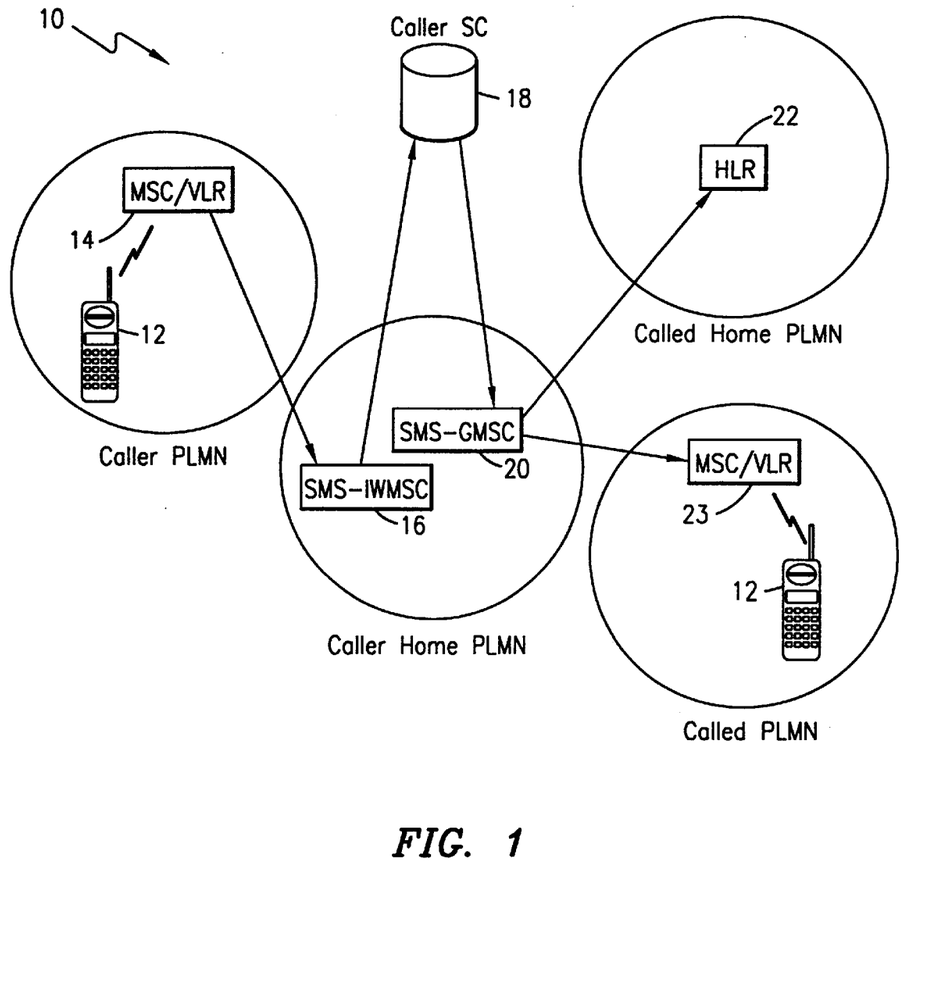
FIG. 1 is block diagram of a conventional point-to-point SMS messaging technique.

In a preferred embodiment of the present invention, a conventional system configuration 10 shown in FIG. 1 may be modified to accomplish selective message transmission and delivery. In particular and with reference to FIG. 1, an originating SME (Short Message Entity) 12, i.e., the mobile phone 12, transmits a short message to the local MSC/VLR (Mobile services Switching Center/Visitor Location Register) 14, which relays the short message out of the particular Public Land Mobile Network (PLMN) servicing the calling subscriber, i.e., the mobile phone 12, to an SMS-MSC 16 (or SMS-InterWorking MSC) associated therewith in a home PLMN of the calling subscriber, as illustrated in FIG. 1. The SMS-INMSC 16 then routes the short message to a Service Center (SC) node 18 servicing the PLMN of the calling subscriber, which, in turn, forwards the short message to an SMS-GMSC (Short Message Service/Gateway Mobile Services Switching Center) 20, a gateway node for handling short messages into and out of the caller's PLMN. The SC 18 preferably parses the incoming short message, determines the destination identifiers, origination authentication, and subscriber status, and selectively transmits the short message, via the SMS-GMSC 20 gateway, to the plurality of destination SMEs indicated, which as shown in FIG. 1 may constitute at least one phone 24. Using the destination identifiers for the called subscriber phone 24, the gateway 20 consults a Home Location Register (HLR) within the home PLMN of the called subscriber for the location of the phone 24. After receiving the location information, the gateway 20 forwards the short messge, via a local MSC/VLR 23, on to the called subscriber phone 24 within the particular PLMN serving the called subscriber.

Figure 2:
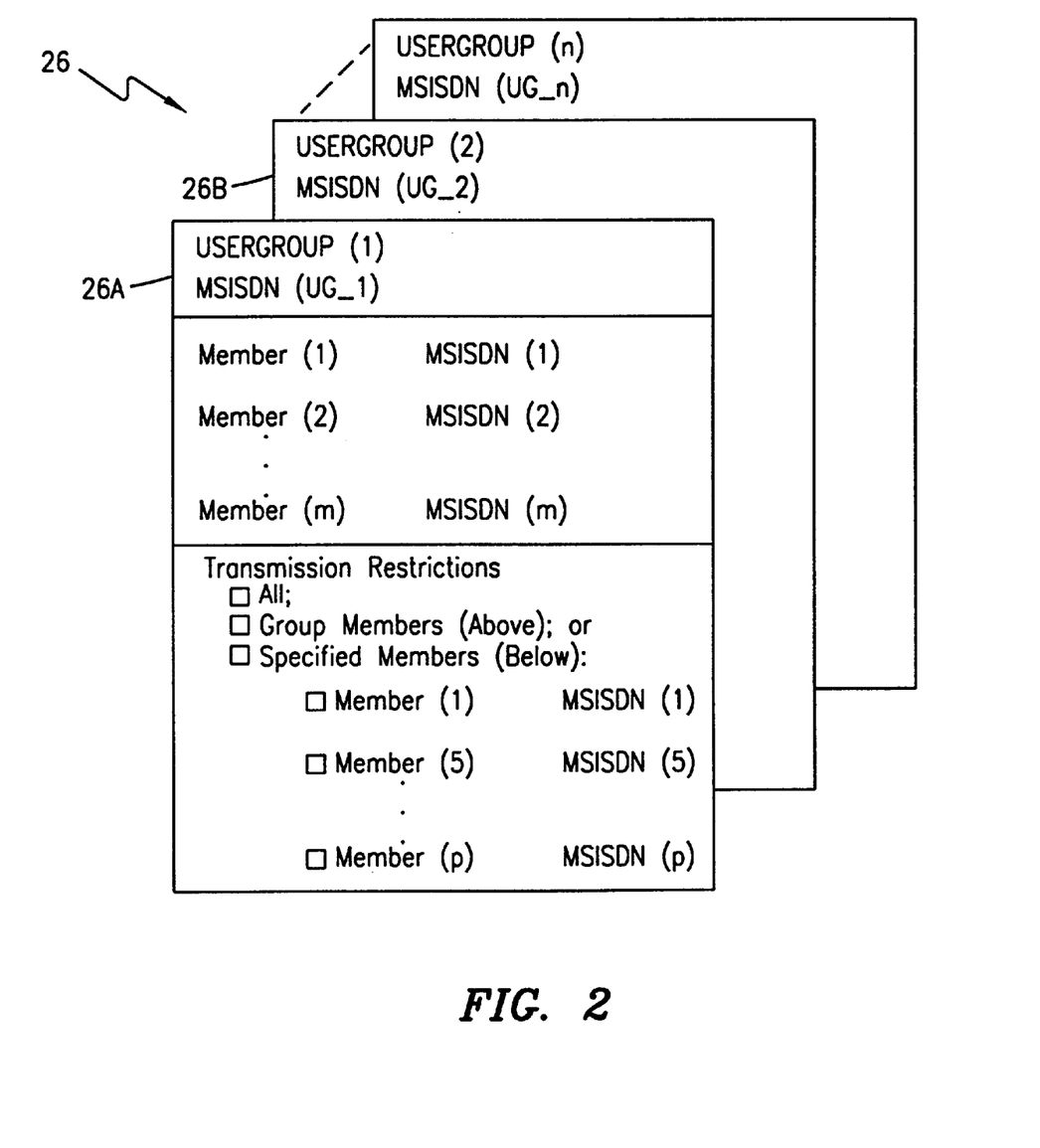
FIG. 2 is an exemplary Usergroup database utilized in the system and method of the present invention.

With reference now to FIG. 2, there is illustrated a database or list, generally designated by the reference numeral 26, of selective multipoint usergroups 26A, 26B, etc. As shown in FIG. 2, n distinct usergroups are defined, each of which may contain any number of the SMS subscribers in the system 10. Each of the subscribers assigned to a given usergroup are identified therein pursuant to their respective Mobile Station ISDN number (MSISDN) or other unique identifier. For example, usergroup 26A contains m members each identified by their respective MSISDN numbers, MSISDN(1) to MSISDN(m). The other usergroups similarly contain a number of subscribers.

It should be understood that individual usergroups may share common members, or, the usergroups may each contain separate members with no commonality of members between usergroups. The precise definition of such groups could be effected in any number of programming languages or databases with it generally understood that each usergroup defines a 'record' in traditional database systems and the individual MSISDN members of each group defining a 'field' in the traditional database systems.

To enable a usergroup to be uniquely identified, each usergroup must have a distinguishing identity. Additionally, since users may wish to execute select multipoint SMS messaging while roaming, it is necessary that each usergroup be identifiable globally. Furthermore, since most users desiring such advanced features, such as that taught by the present invention, will generally be familiar with point-to-point SMS messaging, it is also advantageous that the physical execution of a select multipoint SMS transmission require no more interaction from the user than that required in typical point-to-point SMS messaging. Accordingly, each usergroup 26A, 26B, etc., are each assigned individual MSISDN numbers as are individual mobile units. These MSISDNs assigned to the usergroups are indicated in FIG. 2 as MSISDN(UG-1), MSISDN(UG-2), etc. until MSISDN (UG-n). In this manner, a user may execute a select multipoint SMS transmission by addressing a single MSISDN, an exercise substantially identical to that of executing a point-to-point transmission.

It should be understood that in a preferred embodiment of the present invention restrictions may be placed on who has authorization to send a select multipoint SMS message. For example, by defining a usergroup with an MSISDN unique to that usergroup, unwanted messages could be transmitted to the usergroup members simply by an unwanted originator obtaining that usergroup's MSISDN. To protect the usergroup from such unwanted select multipoint SMS transmissions, each usergroup could be protected with added parameters defining valid MSISDNs from which select multipoint SMS messaging is authorized. Preferably, three levels of restrictions are considered for originating authorization, these levels being (1) authorization to all users, (2) authorization to only members included as usergroup members (targets), and (3) specified originator lists in which specific MSISDNs of valid originating MSISDNs are stored, e.g., members 1, 5, etc., up to member P, as illustrated for usergroup(1) 26A in FIG. 2. Therefore, when a select SMS request is made, the restriction level is preferably determined for the targeted usergroup. If the restriction level is either Group Members or Specified Originators, the originating MSISDN, e.g., from the mobile phone 12, is compared to the appropriate MSISDNs within the usergroup, i.e., the member MSISDNs and the specified originator MSISDNs. If a favorable match is made, the select multipoint SMS request proceeds towards SMS delivery. If authorization is not allowed for a particular originating MSISDN, e.g., the mobile phone 12 user is not a subscriber or is not allowed to access the group, a failure report is generated and the originating MSISDN is notified accordingly.

In a preferred embodiment of the present invention the select multipoint usergroup database 26 is stored within the gateway SMS-GMSC 20, shown in FIG. 1, by which the SMS messaging capabilities may be served over the system 10 in addition to PSTN, Internet and other applications. It should also be understood, however, that the database 26 could also be stored within the SC 18. In another embodiment, the select multipoint usergroup database 26 may be stored within one or more of the MSC/VLRs, e.g., in MSC/VLR 14, which upon receipt of the incoming SMS message may determine whether the originating SME is properly accessing a valid MSISDN. It should be understood that the particular compositions and number of usergroups are preferably defined through prior arrangements between the subscriber(s) and the MSC(s), with the SMS-GMSC 20 or SC 18 preferably serving as a central repository. However, the database 26 could be defined or altered through dial-in procedures utilizing DTMF capabilities by methods well known to those skilled in the art. Such methods would allow the user quick and easy access to modifying, creating or deleting usergroup profiles.

Figure 3:
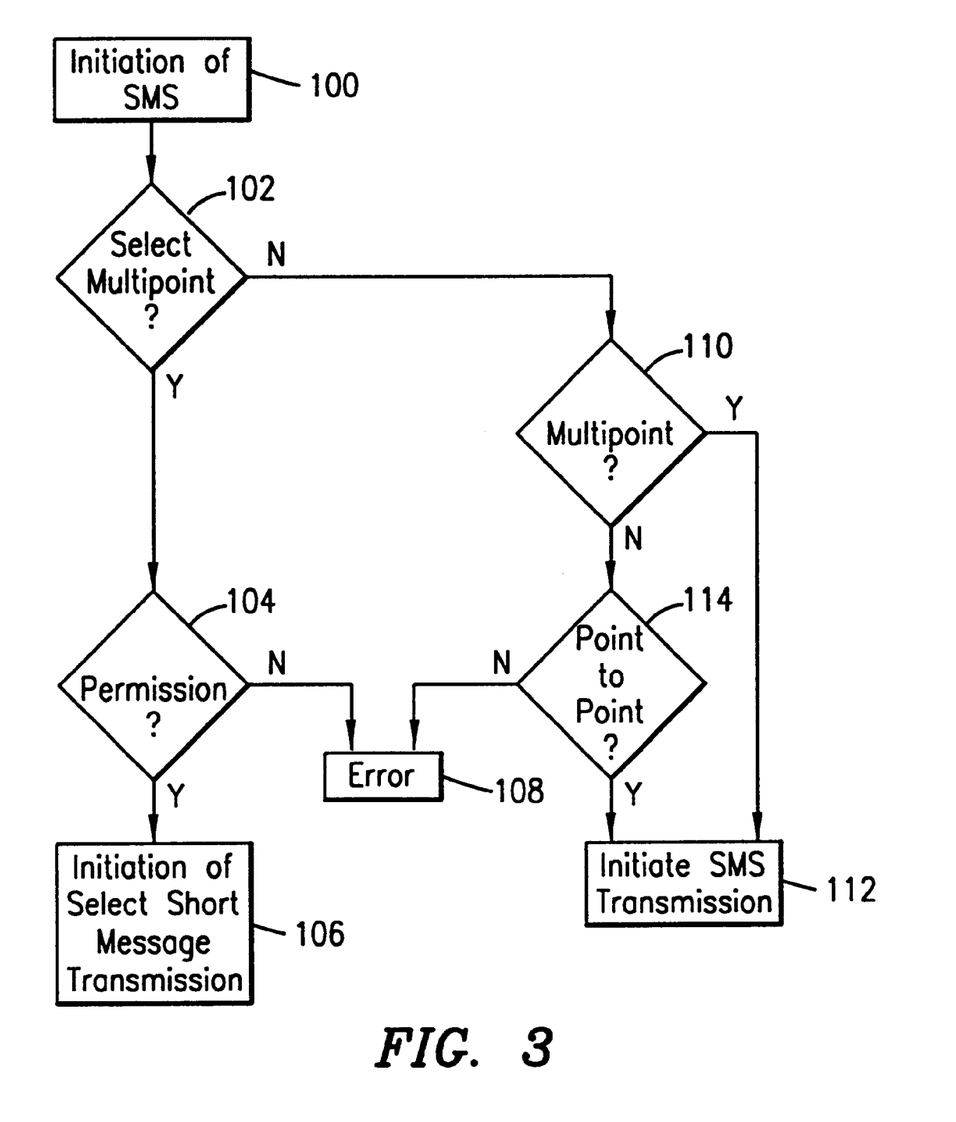
FIG. 3 is a flowchart illustrating a preferred operation of the evaluation of SMS message in accordance with the present invention.

FIG. 3 is a flowchart illustrating a preferred operation of the evaluation of SMS type, i.e., point-to-point, multipoint, or select multipoint, and subsequent initiation of SMS transmission. As described hereinabove and more fully discussed in connection with FIG. 5, the initiation of an SMS message (box 100) includes short message entry by the originating SME 12, entry of destination MSISDN, and transmission of the encapsulated message to the SC 18. Upon reception of the encapsulated message, SC 18 deciphers and parses the message to obtain the destination MSISDN which is immediately compared to the contents of the aforedescribed select multipoint usergroup database 26 to determine if a select SMS request has been made (box 102).

In the event that SC 18 identifies a match between the destination MSISDN and a given usergroup MSISDN within the select multipoint usergroup database 26, the SC 18 then queries the select multipoint usergroup database 26 (step 104) to determine whether the originating MSISDN has permission to transmit a select multipoint SMS message to the previously identified destination MSISDN. If the originating MSISDN is not restricted from addressing the destination MSISDN with a select multipoint SMS message, transmission of the select multipoint SMS message is initiated, as indicated by box 106. If, however, interrogation of select multipoint usergroup database 26 yields that the originating MSISDN does not have permission to transmit a select multipoint SMS message to the destination usergroup, an error message is generated (step 108) where upon completion of error generation and transmission, the SMS operation is terminated.

If, however, a match is not found between the destination MSISDN and a usergroup MSISDN within select multipoint usergroup database 26 (box 102), the SMS operation proceeds to evaluate whether the SMS request is a multipoint transmission (step 110). In the event that a valid multipoint SMS transmission has been requested, SMS transmission is initiated (box 112). If it was found that a multipoint SMS transmission was not requested (box 110), the SMS transmission request is parsed to determine if it is a valid point-to-point request (box 114). Successful evaluation of the SMS request then as a point-to-point SMS transmission request proceeds to initiation of the SMS transmission (box 112). Failure to evaluate the SMS request as a point-to-point transmission request (box 114) results in an error generation (box 108) and termination of the SMS operation.

Figure 4:
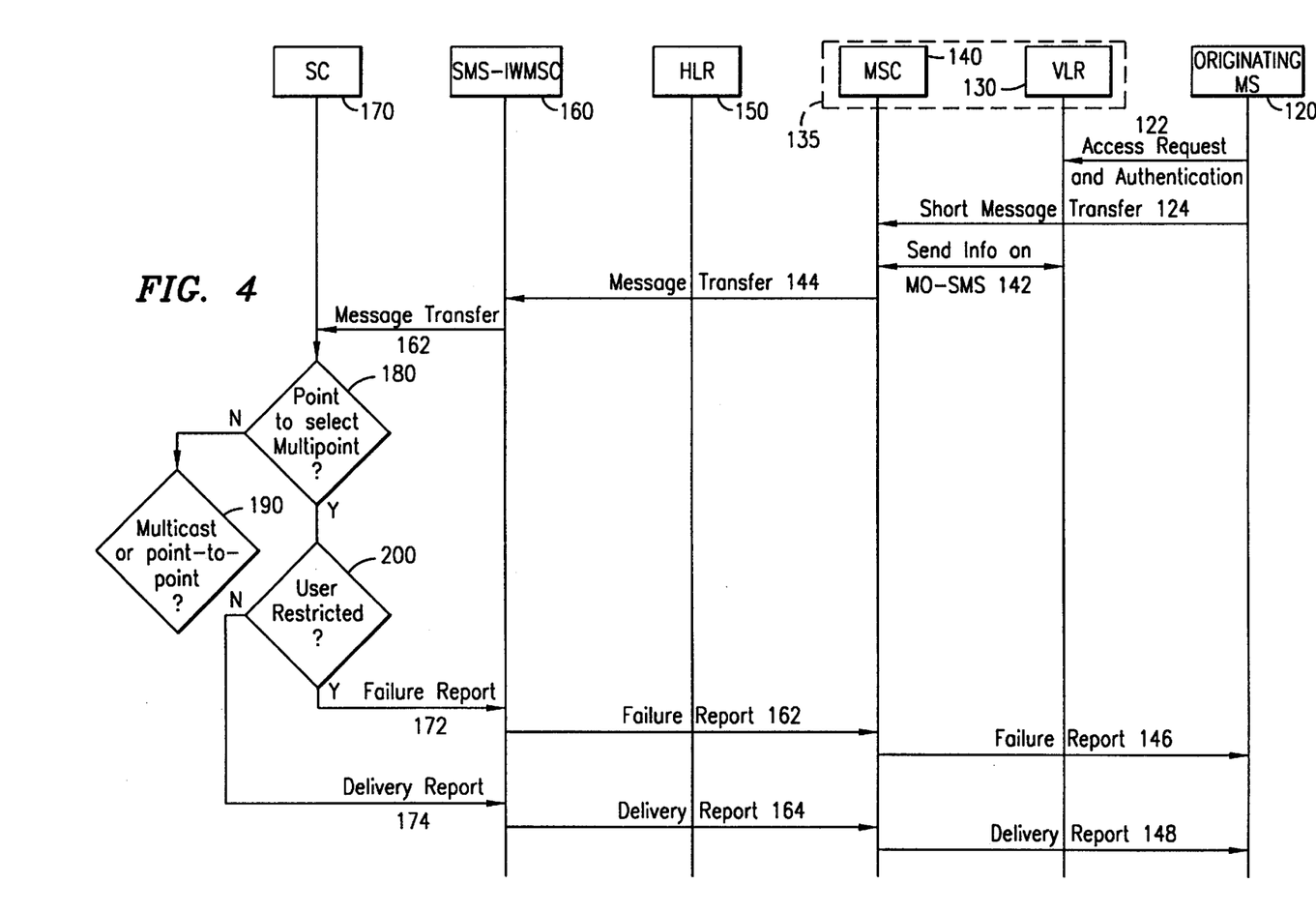
FIG. 4 is an event chronology illustrating a select multipoint SMS request and originating mobile station notification.

With reference now to FIG. 4, there is illustrated an event chronology of a select multipoint SMS request and originating MS notification as occurs in a preferred embodiment of the present invention. Subsequent to entry of the SMS message and destination usergroup MSISDN through an MS 120, access request and authentication (step 122) is made between the MS 120 and an appropriate VLR 130. Assuming successful authentication on the network, the MS 120 is assigned appropriate communication channels by methods well-known to those skilled in the art. The MS 120 then transmits the encapsulated SMS message to an MSC 140 (step 124). Dashed lines around the MSC 140 and the VLR 130 imply the usual cohabitation of the Mobile services Switching Center with the Visitor Location Register, represented by the reference numeral 135, although the two units may be embodied in distinct and separate facilities, as is understood in the art.

The MSC 140 then interrogates the VLR 130 for originating MS 120 information (step 142) where upon return of this information (also shown as step 142), the MSC 140 transmits the SMS message directly to an SMS-IWMSC (SMS internetworking MSC) 160 (step 144) without involving a home HLR 150 for that PLMN. The SMS-IWMSC 160, in turn, forwards the SMS message to an SC 170 (step 162). Upon reception of the SMS message by the SC 170, the message is parsed for the destination MSISDN, which is examined for a match within the select multipoint usergroup database 26 as described in connection with FIG. 2 (step 180).

If the evaluation of the destination MSISDN fails to yield a match between the destination MSISDN and the MSIS-DNs contained within the select multipoint usergroup database 26 (step 190), the method proceeds to determine if the SMS message is a valid multicast or a point-to-point message, as aforedescribed with reference to FIG. 3 and processes the message accordingly. If, however, the SC 170 evaluates (step 180) the destination MSISDN as a valid select multipoint usergroup MSISDN, the method continues by querying the select multipoint usergroup database 26 to determine if the originating MSISDN has restrictions prohibiting the originating MS 120 from addressing the destination usergroup with a select multipoint SMS message (step 200).

In the event the originating MS 120 is restricted from addressing the destination MSISDN with a select multipoint SMS message, a failure report is generated by the SC 170 and forwarded back to the SMS-IWMSC 160 (step 172), which in turn forwards the failure report to the MSC 140 (step 162). The procedure then terminates upon delivery of the failure report to the originating MS 120 by the MSC 140 (step 146).

However, if the SC 170, upon interrogation of select multipoint usergroup database 26, determines that there are no user restrictions, the SC 170 processes the selective short message deliveries and generates a delivery report, which is also forwarded back to the SMS-IWMSC 160 (step 174), and in turn forwarded to the MSC 140 (step 164). The originating MS 120 is notified of successful delivery upon reception of the delivery report from the MSC 140 (step 148).

Figure 5:
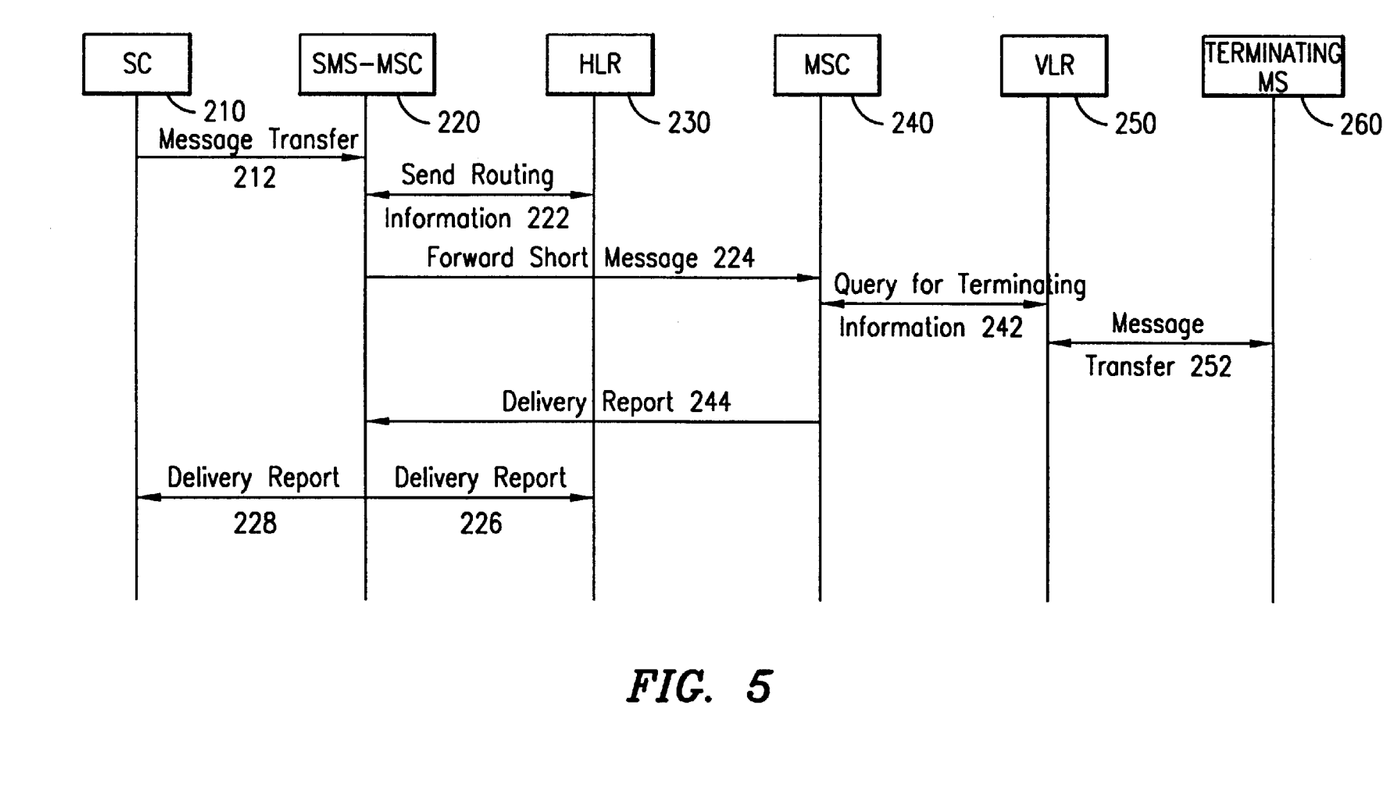
FIG. 5 is an event chronology illustrating a select multipoint SMS transmission to an individual usergroup member.

With reference now to FIG. 5, there is illustrated an event chronology of a valid select multipoint SMS transmission to an individual member of the destination MSISDN usergroup, as occurs upon evaluation of the destination MSISDN as a valid select multipoint usergroup (step 180 in FIG. 3) by an SC 210 and subsequent validation of an originating MS, e.g., MS 120 in FIG. 4, as an authorized originating MS. In particular, the SC 210 queries the select multipoint usergroup database 26 for member MSISDNs of the destination MSISDN usergroup. The SMS message is then encapsulated with the first member's MSISDN, i.e., MSISDN(1) where MSISDN(UG-1) is the destination usergroup MSISDN addressed by the originating MS 120, and transmitted to an SMS-GMSC 220 (step 212), corresponding to the data transference between the SC 18 and the gateway SMS-GMSC 20 in FIG. 1. With reference again to FIG. 4, the SMS-GMSC 220 then queries an HLR 230, the home HLR for the called subscriber, for routing information (step 222). The SMS-INMSC 16 then routes the short message to a Service Center (SC) node 18 servicing the PLMN of the calling subscriber, which, in turn, forwards to an appropriate MSC 240 (step 224) servicing the called subscriber.

The MSC 240 then interrogates a VLR 250 for information on a terminating MS 260 for the called subscriber (step 242) and then completes the SMS message transfer to the terminating MS 260 (step 252) along with delivery notification forwarding to the SMS-GMSC 220 (step 244). The SMS-GMSC 220 completes the delivery notification process by forwarding the delivery report to the HLR 230 (step 226) and the SC 210 (step 228). The entire sequence of events are repeated for each individual member of the destination usergroup specified by the originating MS 100.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for selective delivery of a short message to a plurality of destination devices in a telecommunications system, said method comprising the steps of:

receiving, from a given sending data terminal device, said short message by a service center node in communication with said destination devices, respective pluralities of said destination devices forming respective device groupings, each of said device groupings being selectively created and having a group identifier associated therewith, said short message being sent to a given group identifier; and forwarding, by said service center node, said received short message to the respective plurality of destination devices associated with said given group identifier.

2. The method according to claim 1, further comprising the step of inputting said short message into the given sending data terminal device.

3. The method according to claim 2, wherein the given sending data terminal device is a cellular telephone and said short message is input using a cellular telephone keypad.

4. The method according to claim 2, wherein the give sending data terminal device is a digital terminal and said short message is input through the digital terminal, said digital terminal being connected to said telecommunications system.

5. The method according to claim 1, wherein, in said step of forwarding, said short message is forwarded to said respective plurality of destination devices using the respective MSISDN numbers of the destination devices.

6. The method according to claim 1, wherein said service center node blocks at least one short message to at least one destination device.

7. The method according to claim 1, further including the steps of testing if said given sending data terminal device is among said respective pluralities of said destination devices, and blocking the forwarding of said short message if the test is satisfied.

8. The method according to claim 1, wherein said service center node forwards all short messages from a plurality of sending data terminal devices.

9. The method according to claim 1, wherein said service center node comprises a list containing at least one identifier associated with a respective sending data terminal device, wherein said short message is forwarded to said respective plurality of destination devices if said list contains the identifier associated with said given sending data terminal device.

10. The method according to claim 1, further comprising the step of:

modifying the respective device groupings.

11. The method according to claim 10, wherein said step of modification comprises the addition or deletion of at least one destination device to at least one of said device groupings.

12. A telecommunications system for selective delivery of a short message to a plurality of destination devices, said system comprising:

a service center node in communication with a given sending data terminal device and said plurality of destination devices, respective pluralities of said destination devices forming respective device groupings, each of said device groupings being selectively created and having a group identifier associated therewith, said short message being sent to a given group identifier; and a groupings database, attached to said service center node, said groupings database comprising a listing of the destination devices associated with each said group identifier, whereby, upon receipt of said short message with said given group identifier originated from the given sending data terminal device, said service center node forwards said received short message to the plurality of destination devices associated with said given group identifier.

13. The system according to claim 12, further comprising: input means of the given sending data terminal device for inputting said short message.

14. The system according to claim 13, wherein said input means comprises a cellular telephone keypad.

15. The system according to claim 12, wherein said service center node forwards said short message to a respective plurality of destination devices associated with a respective group identifier, each of said respective destination devices having a respective MSISDN number associated therewith.

16. The system according to claim 12, wherein said service center node blocks at least one short message to at least one destination device.

17. The system according to claim 12, wherein when said given sending data terminal device is not among said respective pluralities of said destination devices, said service center node blocks the forwarding of said short message.

18. The system according to claim 12, wherein said service center node forwards all short messages from a plurality of sending data terminal devices.

19. The system according to claim 12, wherein said service center node comprises a list containing at least one identifier associated with a respective sending data terminal device, wherein said short message is forwarded to said respective plurality of destination devices if said list contains the identifier associated with said given sending data terminal device.

20. The system according to claim 12, further comprising: database modification means for modifying said listing.

21. The system according to claim 20, wherein said database modification means adds or deletes at least one destination device to at least one of said device groupings.

22. A telecommunications system for selective delivery of a short message to a plurality of destination devices, said system comprising:

a first mobile services center node in communication with a given sending data terminal device;

an interworking node in communication with said first mobile services center node, said interworking node receiving said short message originated from said given sending data terminal device via said first mobile services center node;

a service center node in communication with said interworking node;

a gateway node in communication with said service center node;

a second mobile services center node in communication with said gateway node and at least one of said destination devices, said second mobile services center node receiving said short message from said gateway node via said service center node and said interworking node; and a groupings database comprising a listing of respective destination devices associated with respective device groupings, each of said device groupings being selectively created and having a group identifier associated therewith, said received short message being sent to a given group identifier, whereby, said received short message with said given group identifier is forwarded to a respective plurality of destination devices associated with said given group identifier.

23. The system according to claim 22, further comprising:

a home location register associated with said second mobile services center and at least one of said destination devices, said gateway node requesting and said home location register forwarding thereto location information for said at least one destination device.

24. The system according to claim 22, wherein said short message is forwarded to said respective plurality of destination devices via a plurality of second mobile services center nodes.

25. The system according to claim 22, wherein said groupings database is stored within said first mobile services center node.

26. The system according to claim 22, wherein said groupings database is stored within said interworking node.

27. The system according to claim 22, wherein said groupings database is stored within said service center node.

28. The system according to claim 22, wherein said groupings database is stored within said gateway node.

* * * * *